United States Patent
Moroney et al.

(10) Patent No.: US 8,068,610 B2
(45) Date of Patent: Nov. 29, 2011

(54) METHOD AND SYSTEM FOR PROVIDING SECURITY WITHIN MULTIPLE SET-TOP BOXES ASSIGNED FOR A SINGLE CUSTOMER

(75) Inventors: Paul Moroney, Encinitas, CA (US); Scott Contini, San Diego, CA (US); Eric Sprunk, Carlsbad, CA (US); Allen James Anderson, Katy, TX (US)

(73) Assignee: General Instrument Corporation, Horsham, PA (US)

( * ) Notice: Subject to any disclaimer, the term of this patent is extended or adjusted under 35 U.S.C. 154(b) by 2095 days.

(21) Appl. No.: 10/301,092

(22) Filed: Nov. 20, 2002

(65) Prior Publication Data

US 2003/0097563 A1    May 22, 2003

Related U.S. Application Data

(60) Provisional application No. 60/332,386, filed on Nov. 21, 2001.

(51) Int. Cl.
 *H04L 9/00* (2006.01)
 *H04N 7/173* (2011.01)
 *H04N 7/16* (2011.01)
(52) U.S. Cl. ......... 380/277; 725/100; 725/125; 725/151
(58) Field of Classification Search ............... 380/277; 725/151, 131, 100
See application file for complete search history.

(56) References Cited

U.S. PATENT DOCUMENTS

| | | | |
|---|---|---|---|
| 4,633,309 A * | 12/1986 | Li et al. ................... | 380/242 |
| 5,541,670 A | 7/1996 | Hanai | |
| 5,878,141 A * | 3/1999 | Daly et al. ................ | 705/78 |
| 6,118,873 A * | 9/2000 | Lotspiech et al. .......... | 380/277 |
| 6,418,558 B1 * | 7/2002 | Roberts et al. ............ | 725/129 |
| 6,588,017 B1 * | 7/2003 | Calderone ................. | 725/120 |
| 6,678,004 B1 * | 1/2004 | Schultheiss et al. ........ | 348/552 |
| 6,738,905 B1 * | 5/2004 | Kravitz et al. ............ | 713/194 |
| 6,751,402 B1 * | 6/2004 | Elliott et al. ............. | 386/83 |
| 6,757,829 B1 * | 6/2004 | Laczko et al. ............. | 713/187 |

(Continued)

FOREIGN PATENT DOCUMENTS

DE        4440174      5/1996

(Continued)

OTHER PUBLICATIONS

Ramanathan S. et al. "Home Network Controller: A Cost-Effective Method for Providing Broadband Access to Residential Subscribers", International Conference on Consumer Electronics—Digest of Technical Papers. Rosemont, Jun. 7-9, 1995, New York, IEEE, vol. Conf. 14, pp. 378-379, XP000547862. ISBN: 0-7803-2141-3.

(Continued)

*Primary Examiner* — Techane Gergiso
(74) *Attorney, Agent, or Firm* — Stewart M. Wiener

(57) ABSTRACT

Two or more set-top boxes are installed in a household. A communications link, preferably a physical link, is provided between or among the set-top boxes. One of the boxes is designated as a "master" box while the other box or boxes are "slaves." The slave box will use the communications link to communicate in a secured and encrypted manner with the master box. If that communication is severed, e.g., if an attempt is made to move the slave box to another household to provide unauthorized service in that household, the slave box will stop working when it can no longer communicate with the master box.

11 Claims, 2 Drawing Sheets

U.S. PATENT DOCUMENTS

| | | | |
|---|---|---|---|
| 6,904,522 B1* | 6/2005 | Benardeau et al. | 713/156 |
| 6,957,344 B1* | 10/2005 | Goldshlag et al. | 713/194 |
| 7,058,179 B1* | 6/2006 | Maruo et al. | 380/211 |
| 7,336,785 B1* | 2/2008 | Lu et al. | 380/201 |
| 7,484,234 B1* | 1/2009 | Heaton et al. | 725/80 |
| 2001/0038422 A1* | 11/2001 | Yamada et al. | 348/478 |
| 2002/0003884 A1* | 1/2002 | Sprunk | 380/239 |
| 2002/0083438 A1* | 6/2002 | So et al. | 725/31 |
| 2002/0101991 A1* | 8/2002 | Bacon et al. | 380/212 |
| 2002/0104098 A1* | 8/2002 | Zustak et al. | 725/131 |
| 2002/0112175 A1* | 8/2002 | Makofka et al. | 713/200 |
| 2002/0194596 A1* | 12/2002 | Srivastava | 725/37 |
| 2003/0028886 A1* | 2/2003 | Wang et al. | 725/78 |
| 2003/0035540 A1* | 2/2003 | Freeman et al. | 380/210 |
| 2003/0059047 A1* | 3/2003 | Iwamura | 380/201 |

FOREIGN PATENT DOCUMENTS

| | | |
|---|---|---|
| EP | 1079626 | 2/2001 |
| EP | 1079626 A2 | 2/2001 |
| EP | 1126708 | 8/2001 |
| KR | 2003033572 A * | 5/2003 |
| WO | 8505524 | 12/1985 |
| WO | 00/04707 | 1/2000 |

OTHER PUBLICATIONS

Office Action, Canadian App. No. 2,467,907, Apr. 20, 2010.

PCT Search Report, Re: Application #PCT/US02/37592; Feb. 18, 2003.

* cited by examiner

METHOD AND SYSTEM FOR PROVIDING SECURITY WITHIN MULTIPLE SET-TOP BOXES ASSIGNED FOR A SINGLE CUSTOMER

RELATED APPLICATIONS

The present application claims priority under 35 U.S.C. §119(e) from the following previously-filed Provisional Patent Application, U.S. Application No. 60/332,386, filed Nov. 21, 2001 by Paul Moroney et al., entitled "Method and System for Providing Security within Multiple Set-Top Boxes Assigned for a Single Customer," and which is incorporated herein by reference in its entirety.

TECHNICAL FIELD

The present invention relates to the fields of cable and satellite television. More particularly, the present invention relates to the field of operating a network that includes set-top boxes to provide customers with cable or satellite television and other services. The present invention provides a means and method for securely providing multiple set-top boxes for use by a single customer while preventing the unauthorized use of a secondary set-top box by another party.

BACKGROUND

The cable and satellite television industry provides customers with the ability to view a wide variety of television programming for a fee, usually paid monthly. Providing cable or satellite television programming is typically accomplished through a "set-top box." A set-top box is a box of electronics that is connected between the cable or satellite television system and the user's television set. The electronics in the set-top box allow the user to receive the television programming from the cable or satellite system on the connected television set. Subscribers are provided with a set-top box when registering or subscribing with the cable or satellite television provider.

Set-top boxes are also conditional access devices which may allow the display of certain cable/satellite television programs only under certain conditions. For example, a set-top box can be programmed to provide access to specific premium channels if the subscriber pays an additional fee. Access to such premium channels can be restricted through the set-top box if the subscriber has not paid the additional fees.

However, a single set-top box will typically only allow one program to be viewed at a time. Consequently, if a household would like to be able to view two different programs on two different television sets, they have generally been required to purchase a second set-top box and pay twice the monthly subscription fee.

If faced with paying a second full subscription fee, most subscribers will decide instead to get by with a single set-top box and pay only a single subscription fee. This is true even through the subscribers would prefer to have the ability to watch multiple programs simultaneously. Thus, subscribers are actually purchasing fewer services than they really desire because the incremental cost of an additional subscription for a second set-top box is too high. Consequently, from a business model standpoint, many cable and satellite television system operators would like the ability to provide a household with a second set-top box so that multiple programming can be accessed simultaneously without having to charge two full subscription fees.

However, there are dangers to the system operator if secondary set-top boxes are offered at a reduced subscription rate. This danger arises from the potential dishonesty of customers who obtain services that are not properly paid for. For example, suppose the first set-top box within a household has a $40 per month fee and the second has a $10 per month fee. In such a case, a dishonest customer could purchase a second set-top box and give it to his or her neighbor who previously did not have the service. The result is that the provider is collecting $50 per month for service to the two households, when the provider should be collecting $80 per month for service to two separate households.

Moreover, in the past, there have been problems with the dishonesty of the installer: the person who sets up a set-top box when a subscriber first subscribes to the service. Methods exist to prevent an installer from dishonestly giving away cable/satellite service without registering the users of the service in the single set-top box scenario. However, if the installer is allowed to sell and set-up multiple set-top boxes in a single household, it becomes substantially more difficult to ensure that the installer is not dishonestly providing service to those who may be paying off the installer directly for such service.

Consequently, there is a need in the art for a secure means and method of providing multiple set-top boxes to a single subscriber without having to charge a full subscription fee for each such set-top box and while preventing secondary set-top boxes from being used to provide services to those who are not paying the appropriate fees.

SUMMARY

A secure means and method of providing multiple set-top boxes to a single subscriber without having to charge a full subscription fee for each such set-top box is disclosed herein. In the disclosed method and system, the use of a secondary set-top box to provide services to those who are not paying the appropriate fees is prevented. Cryptographic mechanisms are used to ensure that the second set-top box is not used in an unauthorized way.

In one of many possible embodiments, a method of securely providing cable or satellite television services to multiple set-top boxes includes (1) providing a master set-top box; (2) providing a slave set-top box in electronic communication with the master set-top box; (3) sending data from the slave set-top box to the master set-top box; (4) generating a response with the master set-top box based on an authentication key shared by the slave and master set-top boxes; (5) sending the response from the master set-top box to the slave set-top box; and (6) checking the response from the master set-top box with the slave set-top box. If the response is correct, the slave set-top box continues providing the cable or satellite television services. If the response is incorrect, the slave set-top box discontinues providing the cable or satellite television services. This approach provides the benefit of allowing continued operation of the master even if the slave fails, is unplugged, or otherwise goes offline.

BRIEF DESCRIPTION OF THE DRAWINGS

The accompanying drawings illustrate embodiments of the present invention and are a part of the specification. The illustrated embodiment are merely examples of the present invention and do not limit the scope of the invention.

Throughout the drawings, identical reference numbers designate similar, but not necessarily identical, elements.

DETAILED DESCRIPTION

The methods and systems disclosed herein assume a model of operation in which two or more set-top boxes are installed in a household. A communications link, preferably a physical link, is provided between or among the set-top boxes. The communications link between the set-top boxes is used in such a way that one of the boxes cannot easily be moved to an unauthorized location, such as to provide service to a second household.

One of the boxes is designated as a "master" box while the other box or boxes are "slaves." The slave box will use the communications link to communicate regularly in a secured and encrypted manner with the master box. If that communication is severed, e.g., if an attempt is made to move the slave box to another household to provide unauthorized service in that household, the slave box is programmed to stop working when it can no longer communicate with the master box.

In our model, set-top boxes can be in one of three different states: (i) standalone—for households that have only a single set-top, (ii) master—the main or primary of multiple set-top boxes within a household, and (iii) slave—a secondary set-top within a household in communication with a master box. Set-tops can be reconfigured from one state to another state, but preferably only by an authorized installer who obtains reconfiguration data from a customer service representative or authorized agent of the system operator. The authorized agent may support new subscriptions and the installation of new set-top boxes, run billing software for the system and provide "reconfiguration data" to an installer who sets up the set-top boxes within the subscriber's household.

Upon reconfiguring a set-top, the set-top box will display a confirmation number that the installer must report to the authorized agent. The authorized agent enters the confirmation number into the billing software, and assuming the confirmation number is correct, the billing software updates the records of the subscriber's account and, from then on, charges the appropriate monthly fee. An example of this system is illustrated in FIG. 1.

Figure 1:
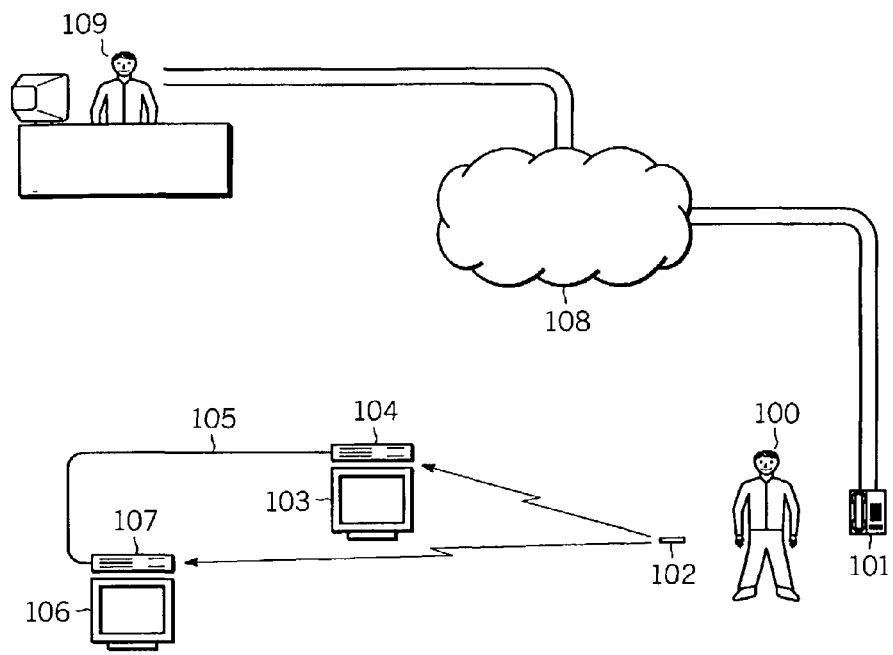
FIG. 1 illustrates the creation of a master/slave set-top box system according to one embodiment of the present invention.

As shown in FIG. 1, an authorized installer (100) is used to set up service for a new subscriber or to expand a subscriber's service to include multiple set-top boxes. The installer (100) installs a first set-top box (104) for use with a first television set (103). In this example, this first box (104) will be the master box. Consequently, the installer (100) contacts an authorized agent (109) working for the cable or satellite television company. The installer (100) may contact the authorized agent (109) using a telephone (101) and local telephone network (108). However, the installer (100) may use any other method of communicating with the authorized agent (109), for example, a wireless phone.

The authorized agent (109) will provide reconfiguration data that must be entered into the set-top box (104) in order to configure that set top (104) as a master box. A remote control unit (102) may be used by the installer (100) to program and configure the first and master box (104).

The installer (100) next installs a second set-top box (107) for use with a second television set (106). Again, the installer (100) receives reconfiguration data for the second box (107) from the authorized agent (109). The installer can then configure the second box (107) as a slave box. Again, the remote control (102) may be used by the installer to program the second box (107).

The installer (100) provides the authorized agent (109) with confirmation numbers for the set-top boxes (104, 107) deployed. The authorized agent (109) can then see that the subscribing household is properly billed for the first set-top box (104) at a full subscription rate and the second set-top box (107) at a lower subscription rate. Subsequent reconfiguration of set-tops could be required, e.g. due to the failure of a master necessitating the associated slave's reconfiguration as the new master. If this occurs, the present system has the benefit of easily facilitating such reconfiguration in a manner analogous to the above. An installer might be sent to the home to reconfigure the slave to be the new master, or the consumer may be allowed to do so himself while on the phone with the authorized agent. Such ease of reconfiguration is a benefit of this system.

In the present example, a physical connection (105) is made between the first (104) and second (107) set-top boxes. However, the communication link between boxes (104, 107) may be wireless, powerline, phone line, or other local communication means. This connection (105) allows the boxes (104, 107) to communicate. If that communication is interrupted, for example, if the slave box (107) is disconnected from the master box (104) and taken to another household to provide unauthorized service at that location, the second set-top box (107) will cease to function. The behavior of disablement upon disconnection is fundamental to the security protection characteristics of this invention. Likewise, the connection means between master and slave should be local in nature, such that it is extremely inconvenient, costly, difficult or impossible to locate either device any substantial distance from the other. This connection means should limit where they can be located in keeping with the assumption that the slave is intended for use in the same household.

In this embodiment, the connection (105) between the set-top boxes (104, 107) is an RS232 cable. RS232 cables must be kept within a particular length or cannot reliably be used for electronic communication between equipment such as the set-top boxes (104, 107). Consequently, if an attempt is made to substitute a much longer RS232 cable, such that the slave box (107) could be taken to a neighboring household to provide unauthorized service for that household, the boxes (104, 107) will no longer be able to communicate reliably over the lengthened cable (105) and thus the slave box (107) will cease functioning. Benefit is seen both from the electronic reliability aspects of excessive cable length, as well as the sheer inconvenience of the connecting cable.

A basic objective of the system is to detect the disconnection or blockage of communication between the master and slave, and to disable slave operation should this occur. The basic means of achieving this is to design the slave so that it will disable itself if it does not communicate with the master regularly. In addition to crude manipulations such as disconnection, there are three main other ways by which one may attempt to defeat the system described above:

1. The dishonest customer may attempt to simulate with a personal computer (PC) the communication between the two set-top boxes so that the set-top boxes can operate separately and independently of each other.

2. The installer or the customer may attempt to reconfigure the set-tops without having the billing software updated, i.e. reconfiguring a slave box as an independently-operable master box.

3. The installer or the customer may attempt to have the billing software updated without reconfiguring the set-tops.

All such methods of cheating may be minimized or eliminated through the use of cryptography. Each set-top is equipped with two cryptographic keys: a unit key and an authentication key. The unit key is used for reconfiguration, and the authentication key is shared between a master-slave pair to verify that they have not been separated. Both keys are delivered to the set-tops in encrypted form, so that neither the installer, customer, nor authorized agent is aware of the true key values. The initial ("provisioning") keys are provided during the manufacturing process of the set-tops.

In order to prevent unauthorized reconfiguration, a set-top box cannot be reconfigured, e.g., from a slave state to a master state, unless a unit key is entered. The input key is processed through a cryptographic hash function by the set-top box which results in a value equal to a previous unit key stored in the set-top box. If the input unit key passed through the hash function does not result in the previous unit key, reconfiguration will not be allowed. Since hash functions are intentionally designed to not be invertible (i.e. to be "one way functions"), this makes it infeasible for anyone to reconfigure a box without knowing the inverse hash of the current unit key.

Consequently, the method disclosed includes generating a "hash chain" of unit keys for each set-top. The last unit key value in this chain is indexed using a "token counter" value of zero, where the unit key for token counter value zero is calculated by passing the unit key for token counter value 1 through the hash function. Each key n in the chain leads to the previous key n+1 when processed through the hash function. This hash chain of unit keys for each set-top box may be stored within the billing software or are otherwise provided to the authorized agent. In this way, an installer cannot reconfigure a set-top box without contacting the authorized agent and obtaining the next unit key in the hash chain for input to the set-top box being reconfigured. Only the authorized agent who runs the billing software or otherwise has access to future unit keys will be able to allow reconfiguration of a set-top box. The bottom of the hash chain is supplied to each set-top box during manufacture or upon provisioning.

Without a loss of generality, other information such as the set-top serial number or the number of times a box has been reconfigured can be required as part of the hash chain, both of which improve security. As a further precaution, in order to prevent the unit keys from being revealed to anybody (including the authorized agent and installer), new unit keys are encrypted under the previous unit keys. Thus, the actual value of the unit keys is known only within the billing software and the set-top box.

This is useful in controlling the confirmation number. The confirmation number is computed from the cryptographic hash of the new unit key. In general, the confirmation number does not need to be too large to ensure security. If the hash function outputs many bytes, the confirmation number can be restricted to some small, designated portion of it (for example, the first 2 or 4 bytes).

Whenever a set-top box is reconfigured, it is also delivered an authentication key along with the new unit key. The authentication key is also encrypted under the previous unit key, thus being known only to the set-top and the billing software. When two set-tops are reconfigured to be a master-slave pair, they must be delivered the same authentication key. Authentication keys are generated by the billing software, and the only strict security requirement is that they must not be easily reproducible outside of the billing software and set-top. This can be done in many ways. For example, generating the values pseudo-randomly or using a hash that is a function of the unit keys of the master-slave pair (or the unit key of the standalone).

Since a master-slave pair share the same authentication key which is unknown outside of the two set-tops and the billing software, it has the necessary cryptographic values to verify that the two set-tops are linked together. This is accomplished through a "ping" protocol. After the elapse of some fixed time interval, e.g. 15 minutes, the slave sends a pseudo-randomly generated value to the master. The master does a cryptographic signature of the received value via a message authentication code (MAC) using the shared authentication key, and sends the result back to the slave. The slave verifies that the correct signature was obtained, including the use of the correct pseudo-randomly generated value sent, and if so, continues operation as normal. If the slave did not receive the correct response or did not receive any response within some fixed time interval, the slave repeats its request up to some fixed number of times. If it still fails to receive the correct reply, it then discontinues displaying cable/satellite television until the master gives the correct reply.

Each set-top box is provided with an initial provisioning token (input data). The provisioning token will at least include a unit key (the bottom of the hash chain) and an authentication key. For new set-top boxes, this can be done within the factory. For legacy set-top boxes, the data will have to be entered by an installer who obtains the information from an authorized agent of the system operator who is operating, for example, a personal computer running a Windows® billing program. Checks will be in place to prevent the installer from placing incorrect data.

The set-top boxes can operate in one of four different states: STANDALONE, MASTER, SLAVE ONLINE, and SLAVE OFFLINE. The STANDALONE state is intended for viewers who do not use the multiple viewing capabilities that the present system can securely provide. The other states are for boxes that are part of a multiple-box system used by a particular subscriber. For these, the MASTER state is intended for the main set-top box within a household. Any others will be slaves. Typically, there will be only one slave (107) per master (104), but the present invention is not so restricted.

A slave (107) will be in state SLAVE ONLINE if it is in communication with a master box (104), or SLAVE OFFLINE if it is not. It is imagined that the latter state will only happen if the connection (105) between the slave (107) and the master (104) is disconnected or interrupted, or if the master (104) experiences a power outage. When the slave (107) is in the SLAVE OFFLINE state, then it will no longer provide service, e.g., display cable/satellite television programming and provide related services.

The slave (107) will need to check to see that it is still in communication with the master (104) by sending a "ping" command. The master (104) is responsible for responding to the command in such a way that the slave (107) is assured that the response came from the master (104). As described above, this ping operation can occur over an RS232 cable connecting the master and slave. However, any other connection (105) can be used. For example, an L band cable connecting both boxes to a satellite antenna can be used, or an AC powerline communications technology such as Homeplug, HPNA, or a wireless home network technology such as 802.11, or Bluetooth technology. For slaves that are online, the ping will preferably happen every 15 minutes, and for slaves that are offline, the ping will happen continuously until an appropriate reply from the master is received.

At times, reconfiguration may be necessary. For instance, a slave box may need to be changed to a master box if the existing master set-top box is broken and needs to be repaired. Alternatively, a standalone box may need to be changed to a master box if a subscriber desires to add multiple-program viewing ability. Reconfiguration will need to be done by an installer (100) who obtains a reconfiguration token (e.g., 21 bytes of data) from an authorized agent (109). Set-top boxes can only be reconfigured if the correct token is obtained. Note that it is also possible for a duly-authorized consumer to perform reconfiguration instead of an installer, to avoid the inconvenience and cost of an installer visit.

Upon a valid reconfiguration, the set-top box (e.g. 104, 107) will preferably display a 2-byte (4 hexadecimal characters) confirmation number to the installer (100) which he or she must communicate to the authorized agent (109) in order for the authorized agent to update the billing records. Each reconfiguration requires a new reconfiguration token, and reconfiguration may be limited to a maximum of times, e.g., 100 times. The reconfiguration token is similar to the provisioning token: it contains a unit key (e.g., 9 bytes) ("UK") and an authentication key (e.g., 9 bytes) ("AK"). The authentication key will be shared between the master (104) and the slave (107) as described above.

For new set-top boxes, provisioning will be performed within the factory by, for example, a personal computer on the manufacturing line. The PC will query the set-top box for its identification number (e.g., 4 bytes) ("CA_ID") and use this to look up its initial provisioning token. Then the set-top box will be loaded with a 9-byte UK, a 9-byte AK which will be used to seed a Pseudo Random Number Generator ("PRNG"), and a 2 byte value of 00 for the token counter. By default, the set-top box will preferably be in the STANDALONE state.

For legacy set-top boxes, the provisioning is necessarily done by the reconfiguration procedure. The legacy boxes need to initially have a token counter value of −1 (represented with 2 bytes) to indicate they have not been provisioned, and will be in the STANDALONE state. If the owner of the set-top box later decides to add a second box, the installer (100) will contact an authorized agent (109) to get a reconfiguration token. This reconfiguration token will actually be a provisioning token, but this fact is invisible to both installer and consumer. The initial provisioning token along with cycle information will be used to seed the PRNG for these boxes.

Figure 2:
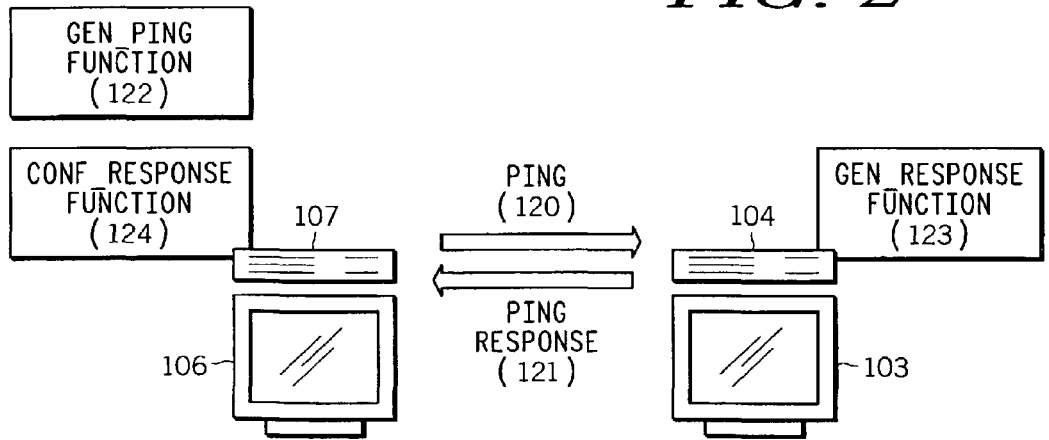
FIG. 2 illustrates the secure communication between the master and slave set-top boxes to prevent separation of the boxes for unauthorized purposes according to one embodiment of the present invention.

As shown in FIG. 2, the ping protocol is for the slave (107) to verify that it is still connected to the master (104). The slave (107) will preferably perform a ping (120) every 15 minutes when in SLAVE ONLINE state, or continuously when in SLAVE OFFLINE state. If the ping (120) fails, the slave box (107) automatically resets its state to SLAVE OFFLINE and discontinues service, e.g., displaying cable/satellite television. If the ping (120) succeeds, the slave box (107) maintains or re-sets its state to SLAVE ONLINE and continues to display satellite television. Note that no reconfiguration is necessary for a slave (107) to change from OFFLINE to ONLINE or vice versa. This allows the slave box (107) to address common conditions such as the loss of power to the master (104), which might appear like an insecure (i.e. relocated) condition to the slave (107).

The protocol has 3 functions: GEN_PING (122), GEN_RESPONSE (123), CONF_RESPONSE (124). The slave (107) runs GEN_PING (122) and CONF_RESPONSE (124), while the master (104) runs GEN_RESPONSE (123). It is assumed that the master (104) and slave (107) share the same authentication key.

GEN_PING: The function GEN_PING (Generate Ping) (122) will preferably be executed by the slave (107) to send a ping (120) to the master (104) every 15 minutes when the slave (107) is online, or more frequently when the slave (107) is offline. The GEN_PING function (122) may work as follows:
1. y=MAX_NUM_ATTEMPTS (assumed to be 3).
2. Use the PRNG to get an 8-byte nonce.
3. While (y>0) do
   a. Send nonce to master.
   b. Wait up to x seconds for a response. If no response, then y=y−1; continue;
   c. If CONF_RESPONSE (nonce, response) succeeds then state=SLAVE ONLINE; return;
   d. /*CONF_RESPONSE failed*/y=y−1;
   e. Wait for 1 to 2 seconds.
4. /* failed after y attempts */state=SLAVE OFFLINE; return;

GEN_RESPONSE: The function GEN_RESPONSE (Generate Response to Ping) (123) will be executed by the master (104) whenever it receives a ping (120). It takes as input the 8-byte pseudo-random value (or "nonce") received from the slave (107), the authentication key AK (stored on master), and Cinfo (to be specified later). The result is a ping response (121) sent to the slave (107), where said response does not retransmit the received nonce back to the slave that originally generated it. The GEN_RESPONSE function (123) may work as follows:
1. If received nonce is not 8 bytes, then return;
   /* data transmission error: do nothing */
2. Compute signature=SIGN(AK, nonce, Cinfo).
3. Send signature+Cinfo back to the slave.

CONF_RESPONSE: The function CONF_RESPONSE (Confirm Response to Ping) (124) is executed when a ping response (121) is received by the slave (107). The slave (107) must confirm the reply given by the master (104) is a correct one in order to confirm that the slave (107) is connected to the master (104) and not to something else. The function (124) takes as input the original, slave-generated 8-byte nonce that it generated in GEN_PING (122), the 8-byte signature sent by the master (104), the Cinfo sent by the master, and the authentication key (AK) (stored on slave). The return value is either SUCCESS or FAILURE.
1. If Cinfo is not a valid Cinfo or if signature is not 8 bytes, then return FAILURE;
2. Compute expected_signature=SIGN(AK, nonce, Cinfo);
3. if expected_signature is not the same as signature, then return FAILURE;
4. return SUCCESS;

Reconfiguration will be necessary in at least the following circumstances: (1) whenever a master needs to change to a slave or a standalone; (2) whenever a standalone needs to change to anything else; (3) whenever a slave needs to change to a master or a standalone; and (4) in the extremely unlikely event of communication failure due to the master and slave not having the same AK.

The last event is extremely unlikely since checks will be in place to notice and correct nearly all input errors, including mischievous attempts at providing false data. Any time a set-top box is reconfigured to be a slave, its master will also be reconfigured. Likewise, any time a set-top box is reconfigured to be a master, its slave will also be reconfigured. This is because each master/slave pair is a matched set and shares the same AK, and each reconfiguration involves a new AK. If only one member of this matched set pair is reconfigured, this will result in a different AK for each device, and subsequently a failure of the Ping protocol. The failure of the Ping protocol will disable display of television, thereby serving as a conspicuous indicator that an error has occurred.

As explained above, the reconfiguration data will be obtained from a customer service representative (109; FIG. 1) and entered into a set-top box by a representative from the satellite or cable television company, the installer (100; FIG. 1). The reconfiguration data consists of 2 blocks of 22 and 29 decimal digits respectively, which shall be converted to a 9-byte and 12-byte block. The conversion is done by treating the values as little endian decimal integers and converting to base 256 little endian integers.

The word "endian" refers to the order in which bytes are stored in memory or transmitted across the wire. Consider the decimal number "593", the digit "5" (five-hundred) is the most significant or "big" digit. The numbers 593 and 693 are significantly different, whereas the numbers 593 and 594 are not significantly different. When ordering bytes in memory, the term "big-endian" refers to putting the most significant byte first, whereas "little-endian" refers to putting the least significant byte first.

The function RECONFIGURE will take as input the address of the current UK, the address of a token counter, the address of the current AK, and the address of the state variable (i.e. MASTER, SLAVE ONLINE or OFFLINE, STANDALONE). It will get the 21 bytes of user input data and send all information into the security function LDCHK (to be described later). LDCHK will perform all error checking, state changes, AK changes, and UK changes. The value returned by RECONFIGURE is the same as that returned by LDCHK, which is either UK_ENTRY_ERROR (The first block of the token was entered incorrectly), AK_ENTRY_ERROR (the second block of the token was entered incorrectly), or TOKEN_ENTRY_ERROR (the entire token needs to be reentered). If an error is returned, the installer must reenter the erroneous values only in order to reattempt reconfiguration. Otherwise, a 2-byte confirmation number (4 hexadecimal characters) shall be computed with the function COMPUTE_CONF_NUMBER (described later) and displayed on the screen so that the installer can communicate the confirmation number to the authorized agent.

An application, for example a billing application, will be needed for a network operator or authorized agent to provide reconfiguration data when it is required. This will preferably be a windows application used by an authorized agent. Whenever an installer needs to reconfigure a set-top box with id CA_ID, the installer contacts an authorized agent. The authorized agent will use the Master Slave Admin application ("Msapp") to look up reconfiguration data for set-top box CA_ID and give the information to the installer. The reconfiguration data will consist of two blocks of data, the first being 22 digits and the second being 29 digits. For readability, the digits of the data will be grouped into blocks of 4. Thus, a sample data will be similar to the following Block 1: XX XXXX XXXX XXXX XXXX XXXX
Block 2: X XXXX XXXX XXXX XXXX XXXX XXXX XXXX where the X's represent digits.

The admin application will be responsible for keeping track of the number of times each set-top box has been reconfigured (i.e. each box's token counter) so that it can readily look up the necessary data for the current reconfiguration. It will also be able to provide earlier reconfiguration data in case of problems. For instance, if the installer is not able to reconfigure a set-top box because he made an error writing down the data required for entry through the remote control, it will be possible for him to contact an authorized agent and obtain the data again. It will also be useful for the installer to be able to access the token counter that may be needed by the authorized agent in order to facilitate debugging of unexpected problems.

A function for getting reconfiguration data (GET_RECONF_DATA) is the core function needed for the master-slave admin application. It takes a 9-byte array UK_TOP_OF_CHAIN which all unit keys for that box are derived from, the CA_ID of the box that requires reconfiguration, an integer j representing a token counter for the box, a variable state which represents the new state for the box, an array of 9 bytes representing a new AK, an array block1 which holds 22 characters, an array block2 which holds 29 characters, and an array conf which holds a 2-byte confirmation number. It is important to the security of this design that the UK_TOP_OF_CHAIN values are kept in the utmost confidentiality. Integer j represents the number of times the box has been reconfigured.

The GET_RECONF_DATA function returns SUCCESS or error value INVALID_INDEX. Upon a SUCCESS, the reconfiguration data will be stored in block1 and block2. Under normal operation, the value j that is input will be obtained from a database stored on the local PC that keeps track of the token counter of each box. However, in case of problems, GET_RECONF_DATA can be used to retrieve data for smaller values of j. If both a master and a slave are being reconfigured to work together, the new AK that is input must be the same for both calls to GET_RECONF_DATA. This value shall be generated randomly on the personal computer. GET_RECONF_DATA works as follows:

1. if j>99 then return INVALID_INDEX.
2. Look up the token_counter for box CA_ID from database.
3. If j>token_counter then return INVALID_INDEX.
4. UK=UK TOP OF CHAIN.
5. For k=100 to j+1 by −1 do
   a. UK=HASH(UK||CA_ID||(unsigned char)k||(unsigned char)(k>>8), 15 ).
6. If (j=−1) then
   a. encrypted_UK=CTS_ENCRYPT9(UK, key k') where k'={k1', k2'} is formed by taking k1' as CA_ID||0||0||0 (seven bytes total) and k2' is seven zero bytes.
7. Else
   a. prev_UK=HASH(UK||CA_ID||(unsigned char) j||(unsigned char)(j>>8), 15).
   b. encrypted_UK=CTS_ENCRYPT9(UK, key k') where k'={k1', k2'} is formed by taking k1' as the first 7 bytes of prev_UK and k2' as the last 7 bytes of prev_UK (remark: it is intentional that the keys k1' and k2' overlap).
8. Encode encrypted_UK as a 22-byte decimal integer and store in block1. Encoding is done by treating encrypted_UK as a little endian integer base 256 and converting to a little endian integer base 10.
9. Compute a key k={k1, k2} by k1=first 7 bytes of UK and k2=last 7 bytes of UK (remark: it is intentional that the keys k1 and k2 overlap).
10. Compute encrypted AK=CTS_ENCRYPT12 (state||0||0||AK, key k).
11. Encode encrypted_AK as a 29-byte decimal integer and store in block2. Encoding is done the same as in step 8.
12. Compute conf to be the first 2 bytes of HASH(UK, 9).

13. Update the database for box CA_ID by replacing the token_counter with token_counter+1.
14. Return SUCCESS.

The symbol "||" means concatenation. In the database, all token counters must initially have the value of −1 if they have not been provisioned, or 0 if they have been provisioned. Getting initial provisioning data from this function is equivalent to inputting the value j=−1.

Upon SUCCESS, the MSapp shall display the two tokens, and then prompt for the installer's confirmation number (2 bytes represented as 4 hexadecimal characters). When this information is entered, the MSapp will verify the data matches the configuration array computed above. If the data does match, the reconfiguration for this box shall be complete, and the MSapp may communicate this fact to the billing software. If the data does not match, the MSapp will preferably allow unlimited attempts to match the confirmation number. It may also have an "abort" option, which will allow the MSapp to process new data without updating the billing software for the current data.

Several security functions will now be discussed. The first security function, CTS_ENCRYPT12, performs "ciphertext stealing" encryption of 12-byte plaintext data using a 14-byte key with two key triple DES_EDE as a subprocedure. It returns a 12-byte ciphertext. Likewise, the function CTS_DECRYPT12 performs the corresponding decryption. The functions CTS_ENCRYPT9 and CTS_DECRYPT9 are the same as CTS_ENCRYPT12 and CTS_DECRYPT12 except for with 9-byte plaintexts and ciphertexts. All functions additionally require a 14-byte key.

Figure 3:
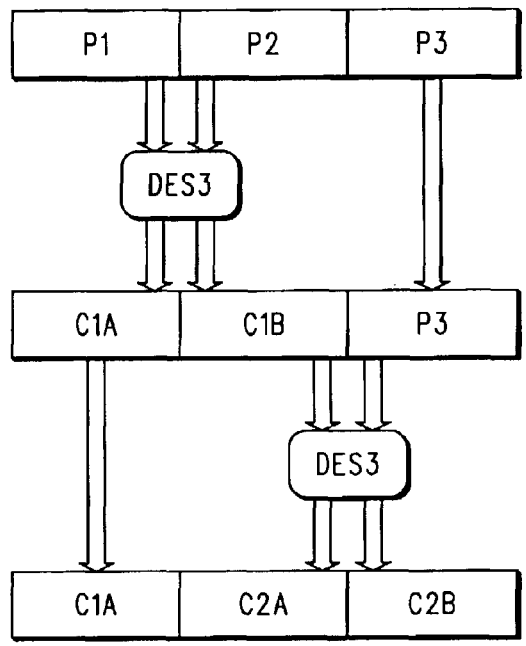
FIG. 3 illustrates the encryption of data items used to secure communications between the master and slave set-top boxes according to one embodiment of the present invention.

As shown in FIG. 3, for CTS_ENCRYPT12, the plaintext is divided into 3 words P1, P2, P3, where a word represents a 4-byte value. Then, the following steps are performed:
1. Compute 2 ciphertext words C1A, C1B=DES3$_k$(P1||P2).
2. Compute 2 ciphertext words C2A, C2B=DES3$_k$(C1B||P3).
3. The output ciphertext is C1A||C2A||C2B.

It must be emphasized that the prepended bytes representing the state and the 2 zero bytes (when the AK is encrypted) must be in word P1.

To decrypt the 12-byte ciphertext, divide it into three words: C1, C2, C3. Then, the following steps are performed:
1. Compute two words P1B, P3=DES3$_k^{-1}$(C2||C3).
2. Compute two words P1, P2=DES3$_k^{-1}$(C1||P1B).
3. The plaintext is P1||P2||P3.

The key k for the DES3$_k$ function will consists of two 7-byte values: k1, k2. DES3k applied to an 8-byte (2 word) plaintext block x works as follows:
1. Compute x1=DES$_{k1}$(x).
2. Compute x2=DES$_{k2}^{-1}$(x1).
3. Compute ciphertext x3=DES$_{k1}$(x2).

The decryption with function for DES3$_k$ is easily derived from the encryption function.

In addition to CTS_ENCRYPT12 and CTS_DECRYPT12, another ciphertext stealing encryption and decryption procedure will be required for encrypting/decrypting 9-byte plaintexts/ciphertexts corresponding to unit keys. These functions will naturally be referred to as CTS_ENCRYPT9 and CTS_DECRYPT9. Unfortunately, the description of CTS_ENCRYPT9 is not as elegant as CTS_ENCRYPT12 since blocks do not fall on natural word boundaries. The steps are as follows:
1. Let C1=DES3$_k$(first 8 bytes of plaintext).
2. Compute C2=DES3$_k$(last 7 bytes of C1||last byte of plaintext).
3. The output ciphertext is the first byte of C1 concatenated with C2.

The steps for CTS_DECRYPT9 are:
1. Let P2=DES3$_k^{-1}$(last 8 bytes of ciphertext).
2. Compute P1=DES3$_k^{-1}$ (first byte of ciphertext||first 7 bytes of P2).
3. The plaintext is P1 concatenated with the last byte of P2.

The function LDCHK will take as input the input token (after conversion to a 21 character value), the address of the current UK, the address of a token counter, the address of the current AK, the address of the state variable (i.e. MASTER, SLAVE ONLINE or OFFLINE, STANDALONE), and the CA_ID. The value returned by LDCHK is either SUCCESS, UK_ENTRY_ERROR (The first block of the token was entered incorrectly), AK_ENTRY_ERROR (the last block of the token was entered incorrectly), or TOKEN_ENTRY_ERROR (the entire token needs to be reentered). The function operates as follows:
1. If token counter is −1 then
   a. Let new_UK=CTS_DECRYPT9(first nine bytes of token, key k') where k'={k1', k2'} is formed by taking k1' as CA_ID||0||0||0 and k2' is all zero bytes.
2. else
   a. Let new_UK=CTS_DECRYPT9(first nine bytes of token, key k') where k'={k1', k2'} is formed by taking k1' as the first 7 bytes of current_UK and k2' as the last 7 bytes of current_UK (remark: it is intentional that the keys k1' and k2' overlap).
   b. If RATCHETT(CA_ID, new_UK, current_UK, token_counter)=FAILURE then return UK_ENTRY_ ERROR.
3. Compute a key k={k1, k2} by k1=first 7 bytes of new_UK and k2=last 7 bytes of new_UK (remark: it is intentional that the keys k1 and k2 overlap).
4. Compute new_AK=CTS_DECRYPT12(last 12 bytes of token, key k).
5. If the first byte of new_AK does not represent a legal state or if the next 2 bytes are not zero then
   a. If token counter is −1 then return TOKEN_ENTRY_ ERROR.
   b. Else return AK_ENTRY_ERROR.
6. If token counter is −1 then
   a. PRNG_INIT_CONTEXT(last nine bytes of new_AK);
7. Change current_UK to be the same as new_UK.
8. Change state to the value of the first byte of new_AK.
9. Change the current AK to the last nine bytes of new_AK.
10. Increase token_counter by 1.
11. Return SUCCESS.

The function RATCHETT is called by LDCHK to verify the validity of the reconfiguration data. It takes as input a 4-byte CA_ID, a 9-byte newly entered UK, the 9-byte current UK, and the 2-byte token counter, and returns SUCCESS if the data is valid or FAILURE if the data is invalid.
1. If token_counter>99 then return FAILURE.
2. Compute a tag of the form HASH (new_UK||CA_ID||token_counter 15).
3. If the tag is the same as the current UK, return SUCCESS.
4. Otherwise, return FAILURE.

The function COMPUTE_CONF_NUMBER computes a confirmation number which the installer will need to give to the authorized agent to prove a reconfiguration has been completed. It takes the 9-byte UK as input and outputs a 2-byte confirmation number, conf.
1. conf=the first 2 bytes of HASH(UK, 9);

The SIGN function takes a 9-byte AK, an 8-byte nonce, and a 4-byte value Cinfo. It performs a cryptographic sign operation on the nonce and Cinfo using key AK. The cryptographic sign algorithm is simply HASH(AK∥nonce∥Cinfo).

The function HASH takes a string and the length of that string in bytes, and returns a 9-byte hash value. The hash function shall be the first 9-bytes of the SHA1 hash of the string.

Figure 4:
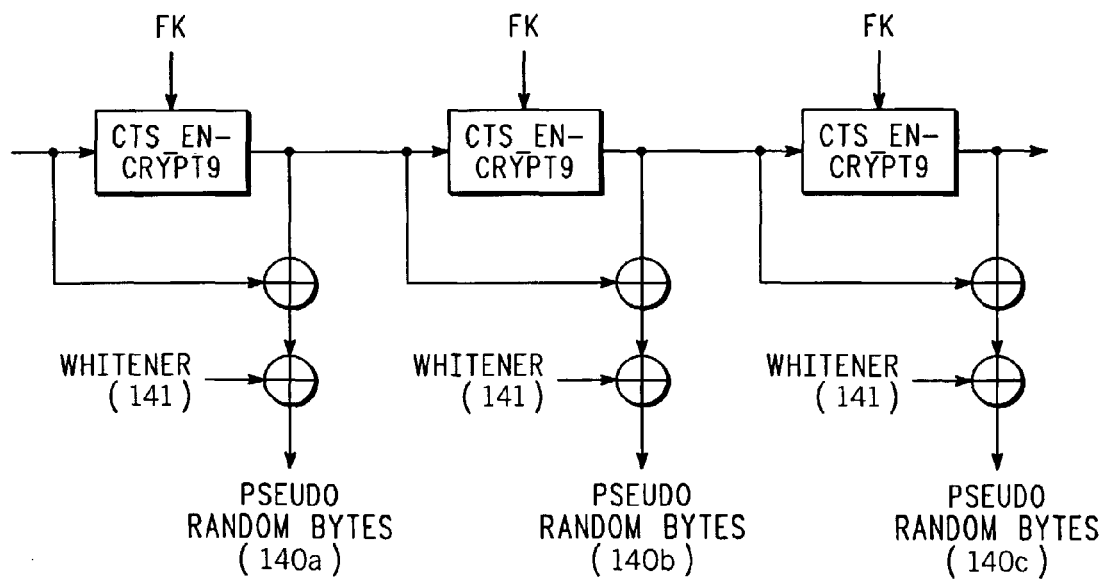
FIG. 4 illustrates a Pseudo Random Number Generator according to one embodiment of the present invention.

FIG. 4 illustrates the master/slave set top box PRNG. The PRNG takes a fixed key (FK) that is stored in program memory, a 9-byte "whitener" string (141), and a 9-byte state which will be fed into the CTS_ENCRYPT9 function. Each iteration will output 9 bytes of pseudo random data (140a, 140b, 140c) that is formed by "exclusive or" of the PRNG state (which is stored in a context variable) with the encrypted PRNG state and the whitener. The new PRNG state becomes the encrypted previous state. The initial PRNG state will be provided during provisioning. The whitener string is intended to be an input string that has a random appearance and changes over time, such as encrypted content data.

The context containing the PRNG state shall be stored in RAM and copied to memory, preferably non-volatile random access memory ("NVRAM"), every 10 iterations. If the processor should ever be reset, the copy of the context in NVRAM shall be written back to random access memory ("RAM") in order to resume operation.

The PRNG_INIT_CONTEXT function initializes in RAM the context of the PRNG. This operation is only intended for use during provisioning and upon a processor reset. In the latter case, the copy of the most recent context that is stored in NVRAM is sent into PRNG_INIT_CONTEXT.

The PRNG_GET_BYTES function takes the RAM context variable which holds the PRNG state, a 9-byte whitener string, and the number of PRNG bytes that the user requests, byte_len. It returns a string of byte_len pseudorandomly generated bytes.

After every 10 iterations that this function is called, the PRNG context shall be copied into NVRAM.

There will be certain variables within our system which must be stored in non-volatile memory (NVRAM). These include (1) the AK (9 bytes), (2) the UK (9 bytes), (3) the token counter (2 byte), a copy of the PRNG context (9 bytes); and the state (1 byte).

Although this protocol has been described using entirely symmetric key cryptography, it can easily be enhanced to include public key cryptography without changing the basic underlying ideas. For instance, the shared authentication key can be replaced with public key signatures and verified using standard PKI techniques including certificates.

Similar protocols are possible with different assumptions, including where the master sends "ping" data to the slave, and disables itself if no slave response is received. Such an alternative would cause both master and slave to disable themselves should either go offline, since both devices would have to be designed to self-disable if no secure data transmission took place. Though it is typically undesirable for both devices to disable in event of one experiencing a normal failure or power disconnect, this still may be useful in some networks.

The preceding description has been presented only to illustrate and describe the invention. It is not intended to be exhaustive or to limit the invention to any precise form disclosed. Many modifications and variations are possible in light of the above teaching. It is intended that the scope of the invention be defined by the following claims.

What is claimed is:

1. A method of securely providing cable or satellite television services to multiple set-top boxes, said method comprising:
providing communication between a master set-top box and a slave set-top box, wherein said providing communication comprises:
sending data from said slave set-top box to said master set-top box;
generating a response with said master set-top box based on an authentication key shared by said slave and master set-top boxes;
sending said response from said master set-top box to said slave set-top box;
checking said response from said master set-top box with said slave set-top box; and,
if said response is incorrect, rendering said slave set-top box non-functional; and
rendering said slave set-top box non-functional if said communication is interrupted.

2. The method of claim 1, wherein said sending data is performed periodically.

3. The method of claim 1, wherein said providing communication, comprises physically connecting said master and slave set-top boxes.

4. The method of claim 3, further comprising connecting said master and slave set-top boxes with RS232 cable.

5. A method of securely providing cable or satellite television services to multiple set-top boxes, said method comprising:
configuring a first set-top box as a master set-top box;
configuring a second set-top box as a slave set-top box, wherein configuring said first and second set-top boxes further comprises providing an initial provisioning token including at least a unit key and an authentication key to both said first and second set-top boxes, and wherein the authentication key is encrypted under a previous unit key; and
providing communication between said master set-top box and said slave set-top box, wherein said slave set-top box will become non-functional if said communication is interrupted; and
wherein said authentication key is encrypted when input to said set-top boxes.

6. The method of claim 5, further comprising obtaining said unit key from an authorized agent of a television system operator.

7. The method of claim 5, further comprising outputting a confirmation number based on the unit key upon configuration of the set-top box.

8. The method of claim 7, further comprising reporting said confirmation number to an authorized agent of a television system operator.

9. The method of claim 8, further comprising confirming that said confirmation number is based on said unit key and, if said confirmation number is confirmed, updating a billing system based on receipt of said confirmation number.

10. A system for securely providing cable or satellite television services to multiple set-top boxes, said system comprising:
means for providing communication between a master set-top box and a slave set-top box, wherein said means for providing communication comprise:
means for sending data from said slave set-top box to said master set-top box;
means for generating a response with said master set-top box based on an authentication key shared by said slave and master set-top boxes;
means for sending said response from said master set-top box to said slave set-top box;

means for checking said response from said master set-top box with said slave set-top box; and,
if said response is incorrect, means for rendering said slave set-top box non-functional; and
means for rendering said slave set-top box non-functional if said communication is interrupted.

11. A system for securely providing cable or satellite television services to multiple set-top boxes, said system comprising:
means for configuring a first set-top box as a master set-top box;
means for configuring a second set-top box as a slave set-top box, wherein configuring said first and second set-top boxes comprises means for providing an initial provisioning token including at least a unit key and an authentication key to both said first and second set-top boxes and wherein the authentication key is encrypted under a previous unit key; and
means for providing communication between said master set-top box and said slave set-top box, wherein said slave set-top box will become non-functional if said communication is interrupted; and
means for encrypting said authentication key when input to said set-top boxes.

* * * * *